(12) United States Patent
Warnez

(10) Patent No.: US 9,066,226 B2
(45) Date of Patent: Jun. 23, 2015

(54) INITIALIZATION OF EMBEDDED SECURE ELEMENTS

(71) Applicant: NXP B.V., Eindhoven (NL)

(72) Inventor: Dimitri Warnez, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 13/960,679

(22) Filed: Aug. 6, 2013

(65) Prior Publication Data

US 2014/0045462 A1 Feb. 13, 2014

(30) Foreign Application Priority Data

Aug. 8, 2012 (EP) .................................... 12179741

(51) Int. Cl.
*H04W 4/16* (2009.01)
*H04W 12/04* (2009.01)
*G06Q 20/34* (2012.01)
*H04L 9/08* (2006.01)
*H04L 9/16* (2006.01)
*H04L 29/06* (2006.01)
*G07F 7/08* (2006.01)

(52) U.S. Cl.
CPC ........... *H04W 12/04* (2013.01); *G06Q 20/3563* (2013.01); *H04L 9/0897* (2013.01); *H04L 9/16* (2013.01); *H04L 2209/80* (2013.01); *H04L 63/0853* (2013.01); *G06Q 20/354* (2013.01); *G06Q 20/355* (2013.01); *G06Q 20/35765* (2013.01); *G07F 7/0826* (2013.01)

(58) Field of Classification Search
USPC .............................. 455/410, 411, 414.1, 418
See application file for complete search history.

(56) References Cited

U.S. PATENT DOCUMENTS

2007/0095927 A1   5/2007   Pesonen
2009/0144202 A1   6/2009   Hurry

FOREIGN PATENT DOCUMENTS

EP   2 482 487 A1   8/2012
GB   2 486 461 A    6/2012

OTHER PUBLICATIONS

Extended European Search Report for Patent Appln. No. 12179741.9 (Dec. 14, 2012).

*Primary Examiner* — Sam Bhattacharya

(57) ABSTRACT

There is described a method for initializing a secure element (112, 122, 212, 222) for use with a host unit (121, 221), the method comprising (a) storing a set of initial keys and a master key in a memory of a secure element (112, 122, 212, 222), (b) providing an identifier of a host (121, 221) unit associated with the secure element, (c) generating a modified set of keys based on the initial set of keys, the master key and the identifier of the host unit, and (d) storing the modified set of keys in the memory of the secure element. There is also described a secure element (112, 122, 212, 222) adapted for being embedded into a host unit (121, 221). Furthermore, there is described a system for initializing a secure element, a computer program and a computer program product.

17 Claims, 2 Drawing Sheets

INITIALIZATION OF EMBEDDED SECURE ELEMENTS

CROSS-REFERENCE TO RELATED APPLICATIONS

This application claims the priority under 35 U.S.C. §119 of European patent application no. 12179741.9, filed on Aug. 8, 2012, the contents of which are incorporated by reference herein.

FIELD OF THE INVENTION

The present invention relates to the field of secure elements, in particular to initialization of embedded secure elements for use in a host unit, such as a mobile communication unit.

ART BACKGROUND

In order to provide mobile communication units, such as mobile phones and smart phones, with a range of functions, such as performing secure credit card transactions and other communications requiring a high level of security, secure elements embedded in a chip have proven useful.

A wireless service provider (also referred to as a secure element issuer) needs to be able to access the secure element in a number of situations, e.g. in order to perform communication, to perform setup operations, or to install, update and delete programs and functions etc. To gain access to the secure element, the issuer needs a set of keys corresponding to a set of keys stored within the secure element. Due to logistic issues in combination with the need for confidentiality, obtaining the right set of keys for a given secure element can be a cumbersome task for the issuers.

US 2007/0095927 A1 describes a system and method where a mobile device manufacturer receives secure elements from a vendor and installs them in the mobile devices as part of the manufacturing process. During installation of a secure element, the manufacturer securely passes an issuer-specific seed value to the secure element. Based on the seed value and a unique identifier of the secure element, the secure element generates a set of keys and stores them in its memory. With knowledge of the unique identifier, the issuer may then generate a corresponding set of keys to gain access to the secure element. However, in many cases the manufacturer will not know already at production time which issuer will actually be managing the mobile device later on, such that selection of the appropriate secure seed value will be difficult. Furthermore, a given issuer will not know the identifiers of the secure elements it will need to manage upfront, and will accordingly not be able to prepare the needed management scripts etc.

There may thus be a need for an improved and simplified way of initializing secure elements.

SUMMARY OF THE INVENTION

This need may be met by the subject matter according to the independent claims. Advantageous embodiments of the present invention are described by the dependent claims.

According to a first aspect there is provided a method for initializing a secure element for use with a host unit. The described method comprises (a) storing a set of initial keys and a master key in a memory of a secure element, (b) providing an identifier of a host unit associated with the secure element, (c) generating a modified set of keys based on the initial set of keys, the master key and the identifier of the host unit, and (d) storing the modified set of keys in the memory of the secure element.

This aspect is based on the idea that by storing a master key together with an initial set of keys in a secure element's memory, providing an identifier of a host unit and generating a modified set of keys using the initial set of keys, the master key and the provided identifier of the host unit, only the holder of the master key will be able to generate a corresponding set of modified keys for a secure element associated with a particular host unit upon receiving the identifier of the particular host unit. Thus, when the associating takes place, only the identifier of the host unit has to be available and thus no information on the identity of the future operator or issuer of the secure element is needed.

In the present context, the term "key" may particularly denote a cryptographic key, i.e. a piece of data, such as a number, that can be used for access control, data validation, encryption/decryption of data etc.

In the present context, the term "set of initial keys" may particularly denote a set or collection of one or more initial keys which key(s) is/are designed for use in connection with e.g. initialization, setup, access control and data communication operations involving the secure element.

In the present context, the term "master key" may particularly denote a key which is only available or known to a single party, such as the supplier of secure elements, e.g. a secure element manufacturer or vendor. Alternatively, the master key may be provided to the supplier of secure elements by another entity, such as an original equipment manufacturer (OEM), and stored in the secure element by the supplier of secure elements. In the latter case, only the OEM will have access to the master key.

In the present context, the term "identifier of a host unit" may particularly denote unique data, such as a number or an alphanumeric data string, which unambiguously identifies a single host unit.

In the present context, the term "associated" may particularly denote that a relation or connection exists between two or more entities, such as a host unit and a secure element, in the sense that the entities are supposed or selected to interact or work together.

The generating of the modified set of keys may involve any cryptographic operation which results in a modified set of keys which can only be reproduced based on the initial set of keys in combination with both the identifier and the master key.

According to an embodiment, the described method further comprises deleting the set of initial keys from the memory of the secure element.

Thereby, the initial keys are replaced by the modified keys. Accordingly, attempts to obtain the master key by processing and analyzing the initial keys and the modified keys together with the identifier will not be possible and security and confidentiality is accordingly enhanced.

According to a further embodiment, the described method further comprises installing the secure element into the host unit.

The installation of the secure element into the host unit may preferably be carried out by a host unit manufacturer who receives the secure element with the master key and set of initial keys stored therein and installs it into a host unit which has a unique identifier. The manufacturer may provide the identifier to the secure element and trigger the execution of the generation of a modified set of keys within the secure element.

According to a further embodiment, the host unit is a mobile wireless device, and the identifier of the host unit is an IMEI of the mobile wireless device.

In the present context, the term "mobile wireless device" may in particular denote a cellular or mobile phone, a smart phone, a PDA or similar portable device which is capable of communicating through a mobile communications network, such as GSM, WCDMA etc.

The IMEI ("International Mobile Equipment Identity") is a unique number provided by the manufacturer to identify each single mobile wireless device produced.

Thus, apart from also providing the IMEI to the secure element (or external device) for generation of the modified set of keys, the manufacturer will not experience any particularly increased workload which will affect the manufacturing process.

According to a further embodiment, the set of initial keys and the master key are stored in the memory by a secure element vendor, and the described method further comprises (a) transmitting the identifier of the host unit together with information identifying a secure element issuer to the secure element vendor, and (b) at the secure element vendor, generating the modified set of keys based on the initial set of keys, the master key and the identifier of the host unit, and transmitting the modified set of keys to the secure element issuer identified by the information.

In the present context, the notion "secure element vendor" may denote a manufacturer or specialized distributor of secure elements. Preferably, only the secure element vendor has access to or knowledge of the master key.

The transmitting of the identifier of the host unit and the information identifying the secure element may preferably be performed after a host unit and a secure element have been associated, e.g. after the secure element has been installed in the host unit by a manufacturer.

Upon receiving the transmitted identifier and information, the secure element vendor can use the master key to generate or recreate the set of modified keys and then transmit it to the relevant secure element issuer.

Thereby, the modified keys can be provided to the secure element issuer without jeopardizing security and confidentiality as the master key is only known by the secure element vendor, not to the manufacturer and/or secure element issuer. Furthermore, the manufacturer will not be burdened with tracking routines during production but only has to input the identifier of the host unit to the secure element during production and then later on, when information on the secure element issuer who will receive the host unit is available, transmit this information to the secure element vendor together with the host element identifier.

According to a further embodiment, the step of generating the modified set of keys comprises applying a mathematical function to the initial set of keys, the master key and the identifier of the host unit.

In the present context, the notion "mathematical function" may denote any function which is capable of delivering an unambiguous result based on at least the initial set of keys, the master key and the identifier of the host unit as arguments.

The generation of a modified set of keys may also be referred to as "rotating the initial keys" or "rotation of the initial keys".

According to a second aspect, there is provided a secure element adapted for being embedded into a host unit. The described secure element comprises (a) a memory adapted for storing a set of initial keys and a master key, (b) an interface for receiving an identifier of a host unit associated with the secure element, and (c) a processor adapted for (i) generating a modified set of keys based on the initial set of keys, the master key and the identifier of the host unit, and (ii) storing the modified set of keys in the memory.

This aspect is based on the idea that by storing a master key together with an initial set of keys in a secure element's memory, receiving an identifier of a host unit, generating a modified set of keys using the initial set of keys, the master key and the provided identifier of the host unit, and storing the modified keys in the memory, only the holder of the master key will be able to generate a corresponding set of modified keys for a secure element associated with a particular host unit upon receiving the identifier of the particular host unit. Thus, when the associating takes place, only the identifier of the host unit has to be available and thus no information on the identity of the future operator or issuer of the secure element is needed.

In the present context, the term "interface" may denote any suitable data input or input/output unit for receiving data representing the identifier of the host unit.

The processor may be a dedicated processor or part of a processing unit capable of performing operations necessary for executing a program, script or applet, which may preferably also be stored in the memory of the secure element, such that the modified set of keys is generated and stored.

According to a third aspect, there is provided a system for initializing a secure element for use with a host unit. The secure element comprises a memory in which a set of initial keys and a master key are stored, and the set of initial keys and the master key are provided by a secure element vendor. The described system comprises (a) a unit for providing an identifier of a host unit associated with the secure element, (b) a unit for generating a modified set of keys based on the initial set of keys, the master key and the identifier of the host unit, (c) a unit for storing the modified set of keys in the memory of the secure element, (d) a unit for transmitting the identifier of the host unit together with information identifying a secure element issuer to the secure element vendor, and (e) a unit located at the secure element vendor and adapted for receiving the identifier and the information, generating the modified set of keys based on the initial set of keys, the master key and the identifier of the host unit, and transmitting the modified set of keys to the secure element issuer identified by the information.

This aspect may be based on the idea that by using a secure element which has a master key together and an initial set of keys stored in its memory, providing an identifier of a host unit and generating a modified set of keys using the initial set of keys, the master key and the provided identifier of the host unit, only the holder of the master key will be able to generate a corresponding set of modified keys for a secure element associated with a particular host unit upon receiving the identifier of the particular host unit. Thereby, when the associating takes place, only the identifier of the host unit has to be available and thus no information on the identity of the future operator or issuer of the secure element is needed. By transmitting the identifier of the host unit and information identifying a secure element issuer to the secure element vendor, the latter can generate a copy of modified set of keys and transmit it to the secure element issuer corresponding to the information. Thereby, the modified keys can be provided to the secure element issuer without jeopardizing security and confidentiality as the master key is only known by the secure element vendor. Furthermore, except for providing the identifier of the host unit and then later on, when information on the secure element issuer who will receive the host unit becomes available, transmit this information to the secure element vendor together with the host element identifier, no special potentially laborious routines are necessary during production of the host unit.

The unit for providing the identifier of a host unit may comprise an input unit, such as a keyboard, for manual input of the identifier. Alternatively, the unit may comprise a camera or scanner for retrieving the identifier from e.g. a label on the host unit, or it may be capable of receiving it from the host unit through data communication.

The transmitting and receiving may take place through a dedicated connection or through a secure network communication, such as a VPN connection.

According to a fourth aspect, there is provided a computer program comprising computer executable instructions which when executed by a computer causes the computer to perform the steps of the method according to the first aspect or any of the embodiments described above.

According to a fifth aspect, there is provided a computer program product comprising a computer readable data carrier loaded with a computer program according to the fourth aspect.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is considered to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment to which the invention is, however, not limited.

DETAILED DESCRIPTION

Figure 1:
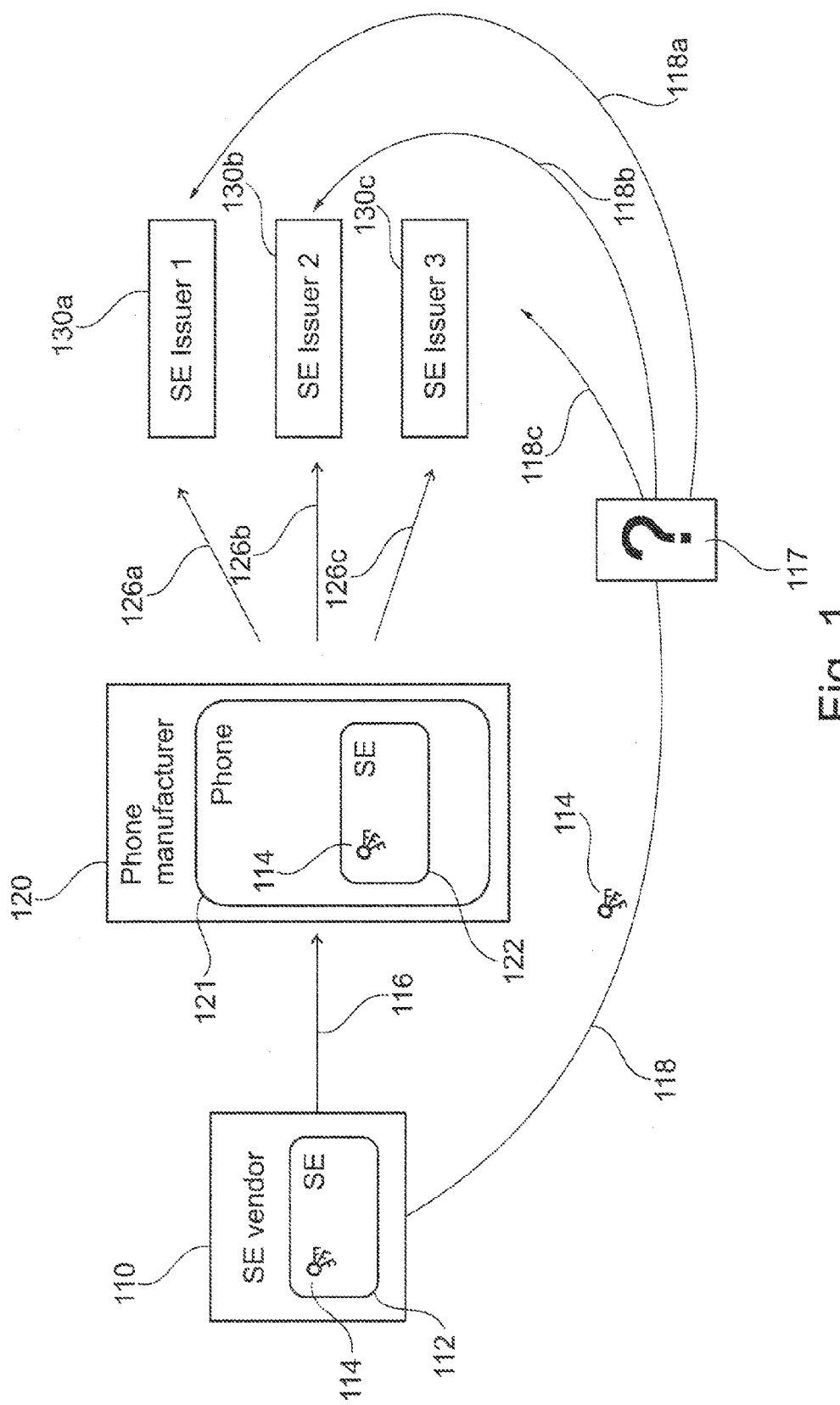
FIG. 1 shows a schematic illustration of a problem addressed by an embodiment.

The illustration in the drawing is schematically. It is noted that in different figures, similar or identical elements are provided with the same reference signs or with reference signs, which differ only within the first digit.

FIG. 1 shows a schematic illustration of a problem addressed by an embodiment.

Figure 2:
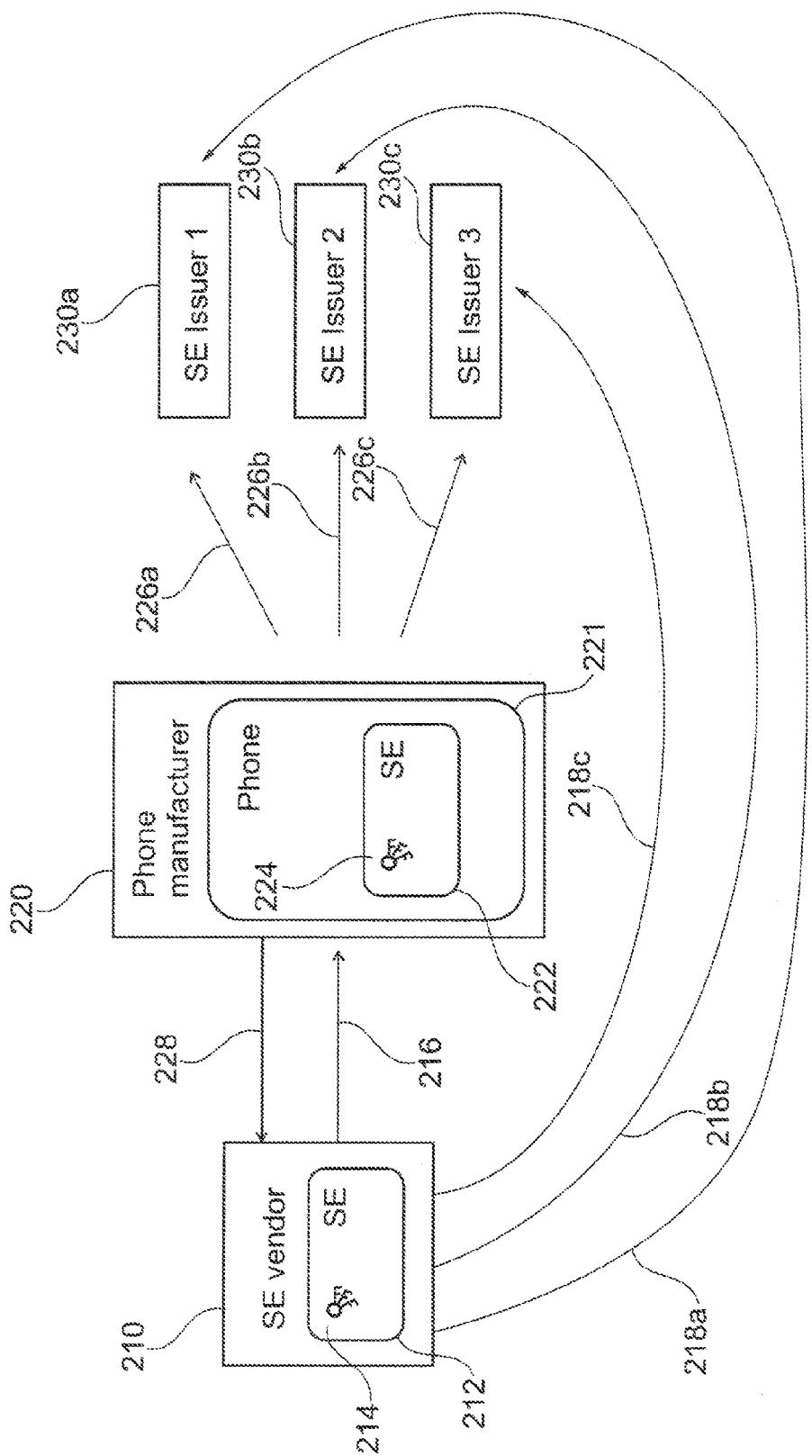
FIG. 2 shows a schematic illustration of communication between entities in accordance with an embodiment.

FIG. 2 shows a schematic illustration of a system according to an embodiment.

FIG. 1 shows a schematic illustration of the problem of distributing secure element keys 114 to secure element issuers 130a, 130b, and 130c. More specifically, FIG. 1 shows a secure element vendor 110, a mobile phone manufacturer 120, a first secure element issuer 130a, a second secure element issuer 130b, and a third secure element issuer 130c. It should be noted that less or more than three secure element issuers may be involved.

The secure element vendor 110 produces secure elements 112 each containing a set of keys 114. As indicated by arrow 116, the secure elements 112 are distributed to the mobile phone manufacturer 120. The manufacturer 120 produces mobile phones 121 containing embedded secure elements 122 with secure element keys 114 and distributes the assembled phones to secure element issuers 130a, 130b, and 130c as respectively indicated by arrows 126a, 126b, and 126c.

For reasons of confidentiality, the manufacturer 120 has no access to or information on the keys 114 of the secure elements 122 embedded in the distributed phones. The vendor 110 knows the keys 114, but does not know which one of the operators 130a, 130b, and 130c should have a specific set of keys 114. The manufacturer 120 knows which phones 121 have been distributed to which issuer 130a, 130b, and 130c, but does not have any further information on the secure elements 122 embedded in the phones 121. Thus, as indicated by arrow 118, the vendor 110 may generally forward keys towards the issuers 130a, 130b, and 130c, but, as indicated by question mark 117, needs further information in order to correctly distribute a given set of keys 114 along one of the connections indicated by arrows 118a, 118b, and 118c. In other words, the problem of providing each issuer (or operator) 130a, 130b, and 130c with the correct set of keys 114 for each phone has to be solved.

FIG. 2 shows a schematic illustration of a system according to an embodiment. Like FIG. 1, FIG. 2 shows a secure element vendor 210, a mobile phone manufacturer 220, a first secure element issuer 230a, a second secure element issuer 230b, and a third secure element issuer 230c.

The secure element vendor 210 produces secure elements 212 each containing a set of keys 214. The set of keys 214 comprises a master key and a set of initial keys. As indicated by arrow 216, the secure elements 212 are distributed to the mobile phone manufacturer 220. The manufacturer 220 produces mobile phones 221 containing embedded secure elements 222. During manufacture, the manufacturer assigns a unique IMEI to the phone 221 and provides the assigned IMEI to the secure element 222 which is (to be) embedded into the phone 221. Based on the master key, the initial set of keys and the provided IMEI, the secure element 222 generates a modified or rotated set of keys 224 and stores it in its memory. After finishing the assembling, the manufacturer 220 distributes the produced phones to the secure element issuers 230a, 230b, and 230c as respectively indicated by arrows 226a, 226b, and 226c.

Furthermore, as indicated by arrow 228, the manufacturer 220 transmits a first list of IMEIs corresponding to the phones which have been distributed to the first operator 230a, a second list of IMEIs corresponding to the phones which have been distributed to the second operator 230b, and a third list of IMEIs corresponding to the phones which have been distributed to the third operator 230c. Upon receiving this information, the secure element vendor 210 uses the master key, the received information and the initial keys to generate a replica of the modified keys corresponding to each IMEI in the received lists.

Finally, as indicated by arrows 218a, 218b, and 218c, the vendor 210 transmits a respective first, second and third list of IMEIs and corresponding modified keys to the issuers 230a, 230b or 230c. Thereby, each issuer 230a, 230b, and 230c receives the modified keys corresponding to each IMEI of the phones which it has actually received from the manufacturer 220.

The various transmissions of data and information from and/or to the vendor 210, the manufacturer 220, and/or the operators 230a, 230b, 230c may be secured by e.g. password protection, VPN or other encryption/decryption technologies.

It is noted that, unless otherwise indicated, the use of terms such as "upper", "lower", "left", and "right" refers solely to the orientation of the corresponding drawing.

It should be noted that the term "comprising" does not exclude other elements or steps and that the use of the articles "a" or "an" does not exclude a plurality. Also elements described in association with different embodiments may be combined. It should also be noted that reference signs in the claims should not be construed as limiting the scope of the claims.

The invention claimed is:

1. A method for initializing a secure element for use with a host unit, the method comprising:
    storing a set of initial keys and a master key in a memory of the secure element;
    receiving an identifier of the host unit associated with the secure element;
    generating a modified set of keys based on the initial set of keys, the master key, and the identifier of the host unit;
    storing the modified set of keys in the memory of the secure element; and
    deleting the set of initial keys from the memory of the secure element.

2. The method according to claim 1, further comprising:
    installing the secure element into the host unit.

3. The method according to claim 1, wherein the host unit is a mobile wireless device, and the identifier of the host unit is an International Mobile Station Equipment Identity (IMEI) of the mobile wireless device.

4. The method according to claim 1, wherein the set of initial keys and the master key are stored in the memory of the secure element by a secure element vendor, the method further comprising:
    transmitting the identifier of the host unit together with information identifying a secure element issuer to the secure element vendor; and
    at the secure element vendor, generating the modified set of keys based on the initial set of keys, the master key, and the identifier of the host unit; and
    transmitting the modified set of keys to the secure element issuer identified by the information.

5. The method of claim 4, wherein the secure element vendor is a manufacturer of the secure element.

6. The method of claim 4, wherein only the secure element vendor has access to or knowledge of the master key.

7. The method according to claim 1, wherein the step of generating the modified set of keys comprises:
    applying a mathematical function to the initial set of keys, the master key, and the identifier of the host unit.

8. The method of claim 1, wherein the host unit has a unique identifier.

9. The method of claim 1, wherein the secure element is installed in the host unit by a manufacturer.

10. The method of claim 4, wherein the secure element is distributed to a mobile phone manufacturer after the set of initial keys and the master key are stored in the memory of the secure element by the secure element vendor.

11. A secure element configured to be embedded into a host unit, the secure element comprising:
    a memory configured to store a set of initial keys and a master key;
    an interface configured to receive an identifier of the host unit associated with the secure element; and
    a processor configured to generate a modified set of keys based on the initial set of keys, the master key, and the identifier of the host unit, and store the modified set of keys in the memory, wherein the secure element is configured to delete the set of initial keys from said memory.

12. The secure element of claim 11, wherein the host unit has a unique identifier.

13. The secure element of claim 11, wherein a secure element vendor is a manufacturer of the secure element.

14. The secure element of claim 11, wherein only a secure element vendor has access to or knowledge of the master key.

15. The secure element of claim 11, wherein the secure element is installed in the host unit by a manufacturer.

16. The secure element of claim 11, wherein the secure element is distributed to a mobile phone manufacturer after the set of initial keys and the master key are stored in the memory of the secure element by a secure element vendor.

17. A non-transitory medium comprising computer executable instructions which when executed by a computer causes the computer to perform a method for initializing a secure element for use with a host unit, the computer executable instruction comprising:
    instructions for storing a set of initial keys and a master key in a memory of the secure element;
    instructions for receiving an identifier of the host unit associated with the secure element;
    instructions for generating a modified set of keys based on the initial set of keys, the master key, and the identifier of the host unit;
    instructions for storing the modified set of keys in the memory of the secure element; and
    instructions for deleting the set of initial keys from the memory of the secure element.

* * * * *